May 14, 1968

F. B. SHAW 3,382,642

METHOD OF FILLING POUCHES

Filed Oct. 14, 1965

INVENTOR
FRED B. SHAW

BY Mason, Porter, Diller & Brown
ATTORNEYS

May 14, 1968 F. B. SHAW 3,382,642
METHOD OF FILLING POUCHES
Filed Oct. 14, 1965 2 Sheets-Sheet 2
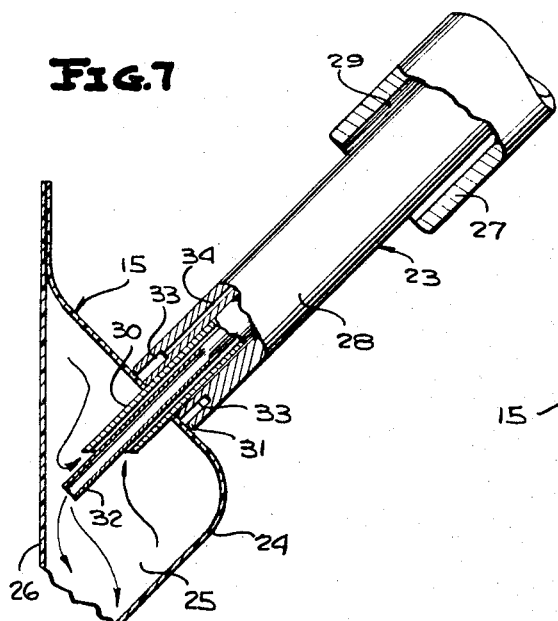
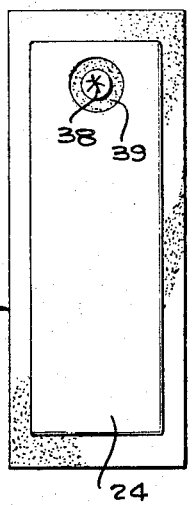
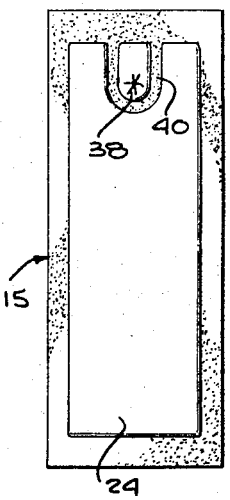
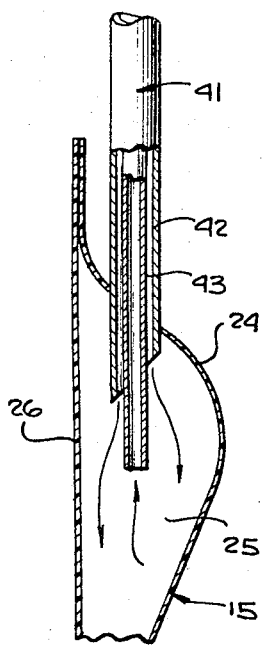
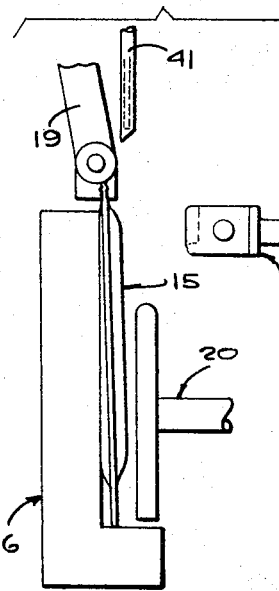
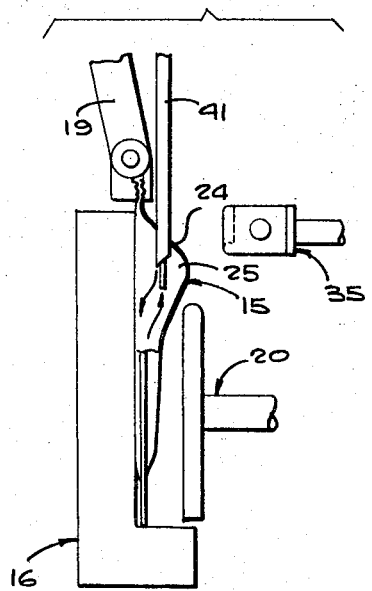
INVENTOR
FRED B. SHAW
ATTORNEYS

United States Patent Office 3,382,642
Patented May 14, 1968

3,382,642
METHOD OF FILLING POUCHES
Fred B. Shaw, Hinsdale,, Ill., assignor to Continental Can Company, Inc., New York, N.Y., a corporation of New York
Continuation-in-part of application Ser. No. 179,048, Mar. 12, 1962. This application Oct. 14, 1965, Ser. No. 496,038
The portion of the term of the patent subsequent to Jan. 24, 1984, has been disclaimed
2 Claims. (Cl. 53—22)

ABSTRACT OF THE DISCLOSURE

A method of filling a completely closed pouch in which a portion of the pouch is inflated utilizing the gases contained therein, the inflated portion is then punctured by a filler member and filled while simultaneously removing gases entrapped therein, after which, the pouch is completely sealed and the portion having the puncture therein is removed.

---

This application is a continuation-in-part of copending U.S. patent application Ser. No. 179,048, filed Mar. 12, 1962, and now Patent No. 3,245,200.

This invention is directed to a method for filling pouches which have been previously sealed with a flowable material and more particularly is directed to a method for filling the pouches aseptic products.

In packaging materials and particularly foodstuffs which are subject to deterioration and decomposition, it is highly desirable to be able to package said materials in a flexible pouch in a manner such that the material can be subsequently stored at room temperatures for unlimited periods without spoilage. More specifically, this invention is particularly directed to the packaging of food products in flexible pouches. However, it is not intended to be limited to these products but may include other materials, such as whole blood, petroleum jelly, finely divided flowable gels, i.e., silicate gel, high purity chemicals and other types of flowable solutions, etc.

Accordingly, this invention has particular utility not only with liquids but also with materials which are flowable under certain conditions and may include, for example, emulsions, suspensions, finely-divide solids, e.g., fluent solids which behave like liquids, and other flowable compositions including entrained materials.

Presently, solids, semi-solids and liquids may be readily packaged, under non-sterile conditions, on a variety of commercially available form-and-fill machines. An outstanding advantage of this invention, however, is the fact that a sterile container may be filled with a sterile product under aseptic conditions and thus avoid the necessity of having to use the more expensive retortable packages. Moreover, not only does this invention avoid packaging which requires sterilization in a retort or the like, but also avoids the problems encountered in packaging products which are prone to thermal decomposition. There are many materials, for example, which thermally decompose and exhibit an associated change in taste under the time and temperature conditions normally required to safely process the product. Many of these materials in the fluid or fluent-solid form, particularly the milk-containing formulations, may be sterilized instantaneously in thin films and, accordingly, can be sterilized best prior to being packaged by following the aseptic packaging process of this invention. By sterilizing the pouches prior to filling, various economies may be obtained and greater variety of materials may be utilized. For example, a lighter gauge structure of retort processible pouches can be successfully exposed when the pouches are empty. Moreover, the pouch structures normally incapable of withstanding thermal stresses may be presterilized, i.e., by gas sterilization, such as ethylene oxide, or by radiation, such as electron beam or gamma radiation.

Accordingly, it is an object of this invention to prepare aseptic, product-filled pouches by aseptically introducing a sterile fill into a sterile pouch.

It is another object of this invention to prepare aseptic, product-filled pouches by inflating a portion of a sealed sterile pouch and subsequently puncturing one wall of said pouch at the inflated area by a needle-like filler member. The pouch is filled with the needle-like member with a sterile flowable material and finally sealing the puncture formed by the needle-like member.

It is still another object of this invention to provide a method of preparing aseptic product-filled pouches in which a pre-sterilized pouch containing a small amount of gas is squeezed together so as to inflate a small portion thereof, permitting a needle-like filler member to be inserted for purposes of filling said pouch with a sterile flowable material.

It is still another object of this invention to provide a method of preparing aseptic product-filled pouches wherein a sterile and completely sealed pouch containing a small amount of gas is squeezed together over a major portion thereof so as to form an inflated portion or bulge to be punctured with the needle-like filler member. The bulge or inflated portion of said pouch is capable of being punctured by the needle-like filler member, permitting the filling of said pouch with a sterile-flowable material and the subsequent withdrawal of said needle-like member with means of sealing off the punctured area from the remaining portion of the pouch.

It is still a further object of this invention to provide a method of preparing aseptic product-filled pouches comprising a sterile and completely sealed pouch containing a small amount of gas which, upon being squeezed together over a major portion thereof, forms an inflated minor portion which permits the entry of a needle-like filler member. The needle-like member is capable of filling said sterile pouch with a flowable material followed by a sealing means whereby the area surrounding the puncture of the needle is sealed to prevent any contamination of the sterilized material.

It is still a further object of this invention to provide a method of preparing aseptic product-filled pouches wherein a portion of a sterile sealed pouch is inflated to form a more readily puncturable wall surface for a needle-like filler member; said wall capable of being punctured with said needle member while being securely held to the needle-like member by suction. The needle-like member is subsequently withdrawn and the pouch is sealed in the area surrounding the puncture.

It is still a further object of this invention to provide a method of preparing aseptic product-filled pouches wherein a portion of the sterile sealed pouch is inflated so as to form a readily puncturable surface to a needle-like filler member, puncturing said wall surface with said filler member and after filling the interior, sealing the area surrounding the puncture and subsequently withdrawing the needle-like member.

These and other objects of the invention will become apparent from a further and more detailed description of the invention as described in the several views illustrated in the accompanying drawing.

In the drawing:
FIGURE 1 is a diagrammatic end view of the means for preparing aseptic product-filled pouches wherein the relationship of the various elements is clearly presented.

FIGURE 7 is a partial sectional view on a larger scale showing the details of one embodiment of the needle-like filler member.

FIGURE 8 is a plan view of one of the embodiments of an aseptic product-filled pouch in accordance with the present invention.

FIGURE 9 is a plan view of another embodiment of an aseptic product-filled pouch of this invention similar to that shown in FIGURE 8.

FIGURE 10 is a diagrammatic end view of the apparatus used for preparing aseptic product-filled pouches similar to that illustrated by FIGURES 1–3 and presents another embodiment thereof.

FIGURE 11 is an end view of the apparatus for filling pouches with aseptic flowable materials similar to FIGURE 10 with parts of the pouch being broken away to more particularly point out the needle-like filler member in puncture engagement with the expanded wall portion of the pouch.

FIGURE 12 is a partial sectional view on a larger scale showing the details of the needle-like filler member similar to the embodiment shown in FIGURE 11.

Figure 1:
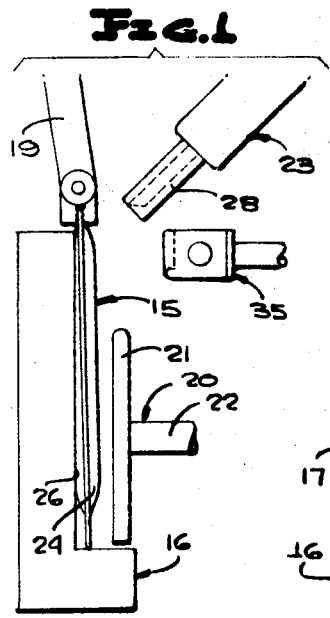
Figure 2:
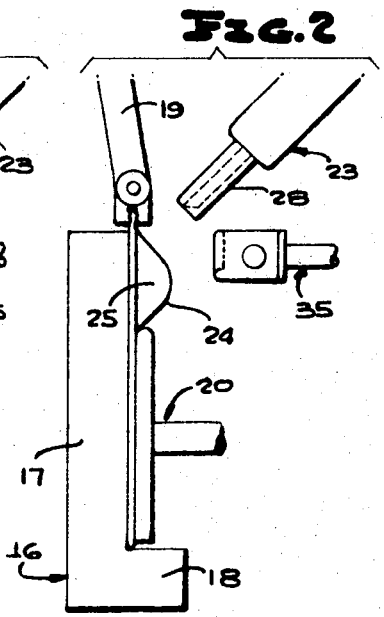
FIGURE 2 is a view of the apparatus similar to FIGURE 1 which more particularly shows the pressure plate engaged against the bottom portion of the pouch forming an inflated top portion.

Referring to the drawings, and more specifically to FIGURES 1–7 thereof, there is disclosed one embodiment of this invention. In FIGURE 1, the first stage of the operation shows a pouch 15 which is placed upon a support member 16 in a position to be filled. The pouch is normally comprised of a thin walled plastic material such as a polyethylene laminate which may either be entirely sealed on all four sides thereof, as illustrated in FIGURES 8 and 9 of the drawings, or completely sealed on certain sides thereof with one or more of the other sides being a fold. Other laminates or plastics which may be used include, for example, laminates of Saran with cellophane and polyethylene, Mylar with polyethylene, paper with foil and polyethylene, paper with foil and the vinyl polymers, etc.

The support may be of any general type and is shown herein as comprising a vertical element 17 and a supporting horizontal element 18. A jaw-type holder 19 is positioned to clamp the upper portion of the pouch and aids in detaining the pouch in a general parallel relationship to the vertical portion 17 of the support 16. A pressure plate 20 having a head 21 and a reciprocating piston 22 is positioned adjacent to the lower portion of the pouch 15 and is reciprocable normal to the position of the pouch 15 to press the lower portion thereof together causing the gases therein to expand at the opposite or upper portion of the pouch as particularly illustrated in FIGURE 2.

By forcing the gases normally contained within the lower portion of the pouch upwardly into the upper portion, said upper portion is inflated and facilitates the ease in which the needle-like filler member, generally designated 23, may be inserted through the forward wall 24 of the inflated portion 25 of the pouch 15. It is obvious that without such inflation, it would be difficult to puncture said wall, e.g., wall 24, without puncturing the outer wall 26 as particularly shown in FIGURE 7. It should be noted that the inflation of the upper portion of the pouch may be carried out by other means, such as by the application of heat from infra-red lamps, which would cause an expansion of the gases to form an inflated portion.

Figure 3:
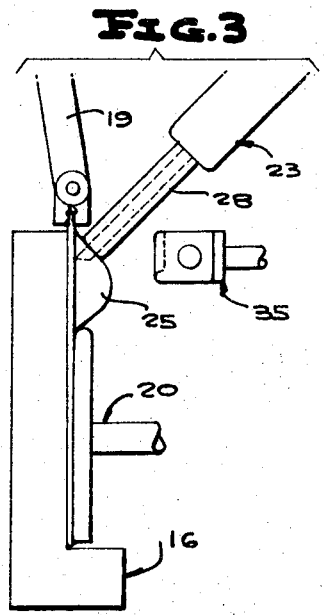
FIGURE 3 is a similar view showing the needle-like filler member in puncture engagement with the inflated wall portion of the pouch.

As more particularly shown in FIGURE 3 of the drawings, the needle-like filler member 23 is brought into engagement with the wall 24 of the inflated portion 25 to puncture the wall 24 and to be in position for introducing a flowable material, i.e., aseptic material, into the interior of the pouch 15. The details of the needle-like filler member 23 may be observed in FIGURE 7 of the drawings wherein the needle-like member 23, preferably of the hypodermic type, is shown as having an upper barrel portion 27 into which a holder 28 is inserted by means of a collar 29. The holder 28 is generally of the cylindrical shape and is in receipt of a hollow needle 30 which is operable from a position extending past the forward butt portion 31 of the holder 28 to a position of hiding within the confines of the holder 28. A hollow tube is reciprocable within and spaced from the hollow needle 30 to form a filling duct 32 through which a flowable material contained in the upper portion of the needle-like filler member 23 may be transported therefrom into the interior of the pouch 15.

The hollow space separating the wall of the filling duct 32 from the wall of the hollow needle 30 forms a vent for the gases contained within the pouch 15 to escape during the replacement thereof by the flowable material introduced through the filling duct 32. The forward butt portion 31 of the holder 28 is further provided with an annular recess 33 which, in turn, is connected to a pipe 34 for operation of a vacuum source (not shown) for producing a vacuum in the annular recess 33 so that the forward butt portion 31 of the needle-like filler member 23 may be held securely against the forward wall 24 of the inflated portion 25 of the pouch 15 by the vacuum within the recess 33.

It should be noted that the needle-like filler member 23 as shown in FIGURE 7 of the drawings is positioned against the upper surface of the inflated portion 25 of the pouch 15 and that the suction applied through the annular recess 33 aids in retaining this previously-mentioned inflated condition of the pouch 15. The vacuum pull exerted through the annular recess 33 further assists in the entry of the hollow needle 30 through the wall 24 of the pouch.

Figure 4:
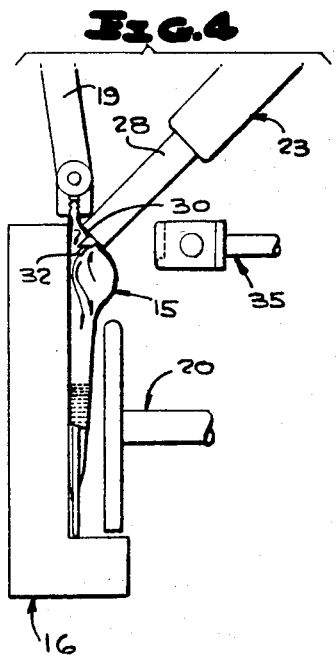
FIGURE 4 is a similar view of the apparatus with portions of the pouch broken away to more clearly show the filling thereof with a sterile flowable material.
Figure 5:
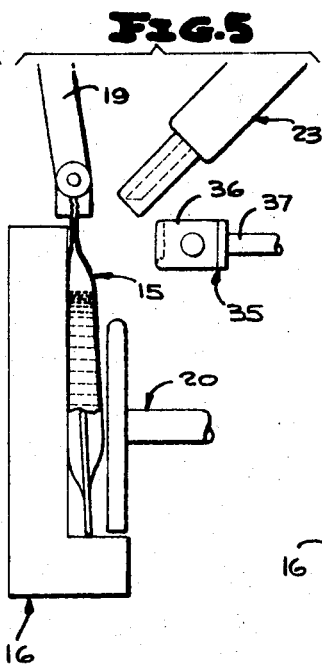
FIGURE 5 is a similar view of the apparatus showing the needle-like filler member after having been removed from the wall of the pouch with the pouch containing a substantial amount of sterile flowable material.

In considering the operational sequence of the process as shown by FIGURES 1–6 of the drawings, there is illustrated in FIGURE 4 thereof the withdrawal of the pressure plate 20 upon the filling of the pouch 15. As indicated, the sterile flowable materials enter the pouch through the filling duct 32 and the gases forced therefrom are vented through the space formed by the hollow needle 30 and the filling duct 32. When the pouch is filled with the flowable material to the desired level, the needle-like filler member 23 is withdrawn to its original position, as shown in FIGURE 5 of the drawings, so as to clear the line of reciprocation of a sealing member 35.

Sealing member 35 may be of conventional design which comprises primarily a heated sealing head 36 mounted upon a reciprocable plunger 37 for movement into contact and away from the upper edge of the filled pouch. Said sealing member 35 is then moved into position against the pouch so as to clamp the walls 24 and 26 thereof against the vertical portion 17 of the support 16 and to heat-seal the area surrounding the puncture 38 made by the needle-like tube 30 of the filler member 23 completely off from the rest of the pouch.

Figure 6:
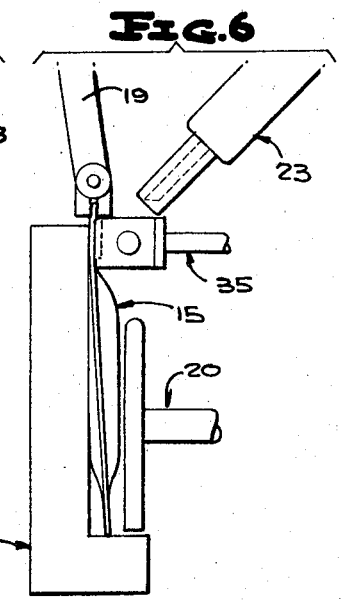
FIGURE 6 is a view similar to FIGURES 1–3 and particularly illustrates the sealing member in engagement with the portion of the pouch surrounding the puncture formed by the needle-like filler member.

In other words, the inflated wall portion 24 containing the puncture is sealed by the sealing head 36 to the back wall member 26 to prevent the flowable material in said pouch 15 from escaping after the seal is formed, as shown in FIGURE 6.

Referring to FIGURES 8 and 9 of the drawings, there is shown two types of sealing designs that may be applied to the walls 24 and 26, respectively, of the filled pouch 15 to seal the puncture 38, represented by the criss-cross lines, completely off from the rest of the pouch. The circular sealing area 39 is shown in FIGURE 8 to seal off the puncture from the rest of the pouch while a U-shaped sealing area 40 is sealed together and cooperates with a portion of the edge seal of the pouch to completely separate the puncture 38 from the rest of the pouch shown in FIGURE 9. This is, of course, necessary to retain the aseptic qualities carefully imparted to the seal pouch, as it is believed obvious that if the area surrounding the puncture were not sealed off from the rest of the pouch, atmospheric gases containing impurities would seep in through the puncture and, thus, contaminate the materials located within the main sterilized portion of the pouch. The seal area also prevents the fill or composition, if maintained in a flowable condition within the pouch 15, from leaking out through the puncture 38.

In some cases, upon withdrawing the filler member 23 from the wall 24 in the area of the puncture 38, small deposits of the fill are located within the area bounded by the sealing area 39 or 40. Upon extended periods of storage, these minute quantities of fill material located within the area bounded by the sealing area 39 or 40 may be adversely affected, such as by decomposition, upon being in contact with the atmospheric gases and, thus, present not only an unsightly and undesirable appearance, but also an odor as well. To avoid this, it is desirable to completely seal the area bounded by the sealing area 39 and 40 dependent upon the particular design of the sealing area as shown by FIGURES 8 or 9.

It, of course, should be understood that the circular and U-shaped seal areas as shown in FIGURES 8 and 9, respectively, are illustrative only and that design limited to the imagination and considerations to be hereinafter presented may be utilized to seal off the puncture area from the rest of the pouch. Thus, for example, it is also contemplated to include as a preferred embodiment of this invention the use of a linear seal which is substantially parallel to the top of the pouch and immediately below the puncture. By using the linear or straight-line seal, it is possible to completely seal off the punctured area from the sealed filled section of the pouch which may be subsequently cut off and discarded. The size or width of the linear seal which may run the full width and be substantially parallel to the top of the pouch is not critical but may cooperate with the sealed edges of the pouch so as to completely separate the punctured area from the rest of the filled pouch.

This type of linear seal is particularly useful in sealing off the main portion of the filled pouch from the punctured area when it is necessary to seal the pouch before withdrawing the filler needle. Thus, in many instances where a sterile package is a must, it will be necessary to seal the pouch prior to the withdrawal of the filler needle so as to absolutely avoid the possibility of atmospheric contamination. To accomplish this, a horizontal linear seal substantially parallel with the top of the pouch may be made immediately below the puncture before the needle is withdrawn.

A still further embodiment of the invention is illustrated in FIGURES 10–12 of the drawings wherein a modified needle-like filler member 41 is shown. The member 41 is adapted to puncture the inflated portion 25 of the pouch 15 as shown most clearly by FIGURES 11 and 12 in a larger scale. The construction of the needle-like filler member 41 is best illustrated in FIGURE 12 wherein an outer pointed filling duct 42 is provided with a reciprocable inner concentric tube 43 which serves as a vent for the gases which are replaced by the flowable material entering the pouch through the filling duct 42. Of course, it is obvious that the position of the vent and filling duct may be reversed. In other words, the filling duct 42 may become the vent and the vent 43 may become the filling duct.

The filler member 41 moves in line with the pouch 15 and punctures the inflated portion 25 thereof approximately at the top of the sealed portion of the walls 24 and 25. With this modification, the puncture 38 formed by the point of the filling duct 42 may be completely sealed off from the rest of the pouch while the filler member 41 is still in penetrating contact with the interior of the pouch 15. Of course, it is obvious that in utilizing such a procedure, it may be necessary to use a U-shaped area 40, as shown in FIGURE 9, or a similar modification thereof.

With either of the modifications as hereinabove described, many pouches may be filled at one time in contrast to one shown and illustrated in the drawings. With this arrangement it is also contemplated that the separately sealed pouches each may have a sealed edge in common which, during the filling operation, could be perforated so as to assist in the separation of one sealed pouch from the other. In the case of filling a single pouch, however, a single filler member is employed, but whenever groups of joined pouches are to be filled, multiple filler members may be employed so that the entire group of pouches can be filled and sealed simultaneously. It is also contemplated that in those cases where desired, a sterile ray lamp may be mounted in such a position so as to impinge upon the pointed head of the filler member so as to minimize the possibility of bacteria coming into contact or being introduced into the inner portion of the pouch 15 upon puncturing the inflated portion 25. After the pouch 15 has been filled to the desired lever, a non-oxygen-containing gas or inert gas such as nitrogen may be introduced through the filling duct so as to sweep out any remaining portions of atmospheric gases that might be contained within the pouch. It is also contemplated that steam may be introduced into the pouch in the same manner so as to sweep out any remaining undesirable gases. Moreover, it is possible to carry out this gas-purging operation simultaneously with the filling by incorporating means such as a third concentric tube (not shown) within the filler member 23 or 41. As explained above, it is possible by utilizing the equipment set forth in the above manner contemplated, to fill previously sterilized pouches with sterilzed material under sterile conditions to obtain an aseptic product within the pouch which cannot be contaminated or decomposed after long periods of storage.

While the above disclosure sets forth a number of specific embodiments, it is obvious that there are other modifications and variations which can be resorted to without departing from the spirit of the invention, except as more particularly pointed out in the appended claims.

What is claimed is:

1. A method of filling a sealed pouch comprising the steps of supporting a completely closed pouch in an upright position to be filled, inflating a portion of the pouch utilizing gases contained therein, moving a filler member through one wall of the pounch adjacent a top of the pouch and within the inflated portion for communication with the interior of the pouch, introducing a flowable material into the pouch through the filler member while simultaneously removing the gases entrapped therein, and completely sealing off the puncture formed by the filler member from the rest of the pouch prior to the withdrawal of the filler member from the pouch by a linear seal below the puncture and substantially parallel to the top of the pouch.

2. A method of filling a sealed pouch comprising the steps of supporting a completely closed pouch of a predetermined length as measured in a predetermined direction, inflating a portion of the pouch utilizing gases contained therein, moving a filler member through one wall of the pouch adjacent but spaced from a top edge of the pouch and within the inflated portion for communication with the interior of the pouch, introducing a flowable material into the pouch through the filler member while simultaneously removing the gases entrapped therein, completely sealing off the puncture by the filler member from the rest of the pouch prior to the withdrawal of the filler member from the pouch by a linear seal below and spaced from the puncture and substantially parallel to the top of the pouch, and removing the punctured portion of the pouch by cutting the pouch parallel to and completely across the linear seal whereby the predetermined length of the pouch is reduced and the completed filled and sealed pouch is devoid of evidence indicative of the manner by which the pouch was formed.

References Cited

UNITED STATES PATENTS

| | | |
|---|---|---|
| 2,606,704 | 8/1952 | Nichols. |
| 2,861,406 | 11/1958 | Holsman et al. _____ 53—22 X |
| 2,888,788 | 2/1959 | Gebhardt _____ 53—22 |
| 3,299,603 | 1/1967 | Shaw _____ 53—22 X |

TRAVIS S. McGEHEE, *Primary Examiner.*